Feb. 14, 1961 H. PH. G. A. R. VON ZBOROWSKI 2,971,724
ANNULAR WING FLYING MACHINES
Filed April 3, 1956 7 Sheets-Sheet 6

Feb. 14, 1961 H. PH. G. A. R. VON ZBOROWSKI 2,971,724
ANNULAR WING FLYING MACHINES
Filed April 3, 1956 7 Sheets-Sheet 7

INVENTOR
Helmut Ph. G.A.R. von Zborowski
BY
ATTORNEYS

United States Patent Office 2,971,724
Patented Feb. 14, 1961

2,971,724

ANNULAR WING FLYING MACHINES

Helmut Ph. G. A. R. von Zborowski, Chateau de Boussy, Saint Antoine, par Brunoy, Seine-et-Oise, France Filed Apr. 3, 1956, Ser. No. 575,731

Claims priority, application France Feb. 19, 1952

4 Claims. (Cl. 244—12)

The invention relates to flying machines, and more particularly to such machines having substantially annular lift-producing surfaces forming the essential aerodynamic supporting part of the machine.

The primary object of the invention is to provide a machine which operates more easily than conventional machines. More particularly, the invention contemplates a machine which can make turns without banking, so that the complicated manipulation of the controls which is necessary in ordinary aircraft is not required.

Another object of the invention is to provide a machine which is inexpensive in construction and can be built more cheaply than ordinary aircraft of equal performance.

A further object of the invention is to provide a flying machine capable of travelling at high speeds, including supersonic speeds.

Still another object of the invention is to provide a flying machine capable of taking off and landing vertically and of flying horizontally between take-offs and landings.

The invention in general contemplates the provision of an annular wing structure of air-foil cross-section, symmetrical about its longitudinal axis, this annular wing structure being the essential lift-producing surface of the machine, in combination with a power plant exerting a propelling thrust parallel to and at most little distant from the axis of the annular wing structure. The machine is capable of flying in level flight, since it is provided with aerodynamic control members capable of maintaining it at a positive angle of incidence with respect to its trajectory, and with a power plant of sufficient power to drive it at sufficient speed at such positive angle of incidence as to produce a lift the vertical component of which is at least equal to most of the weight of the machine.

For a machine capable of vertical take-off, the power plant should exert a thrust greater than the weight of the machine.

In its preferred forms, the machine according to the invention has a thermal power plant (internal combustion engine driving a propeller, turbo-prop, turbo-jet, ram-jet or thermonuclear device) which produces hot gases in one form or another, these gases being delivered into or formed in the interior of the annular wing at an intermediate point thereof.

This application is a continuation-in-part of my application S.N. 325,074, filed December 10, 1952 (now abandoned).

The invention contemplates certain improvements on the structure shown in my application entitled "Annular Wing Flying Machines" S.N. 553,604, now Patent No. 2,907,536, filed December 16, 1955. The general arrangement shown in that application was disclosed in my application S.N. 242,491, filed August 18, 1951 (now abandoned).

The present application provides take-off and landing gear for an annular wing flying machine, and certain control aids to ensure proper operation of the machine, especially during take-offs and landings.

Further objects and advantages of the invention will appear more fully from the following description, especially when taken in conjunction with the accompanying drawings which form a part thereof.

The object of my invention is to provide an aircraft of simple construction (and reliable in operation) which is capable both of rising vertically and of flying horizontally at speeds at high and even higher than those of conventional airplanes.

Figures 1, 2:
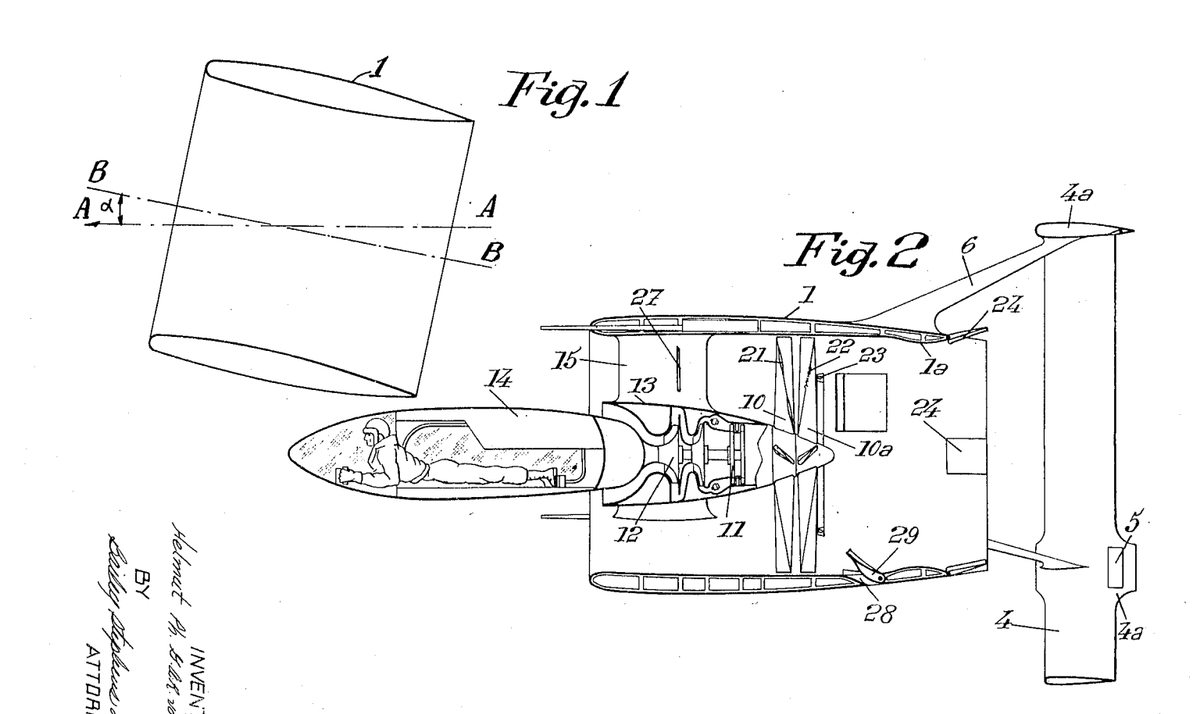
Figure 1 is a diagram explaining the operation of a machine embodying the invention.
Figures 2 and 3 show, in axial section and in front view respectively, an aircraft intended to rise vertically from the ground made according to a first embodiment of my invention.

Figure 1 shows schematically the operation of a flying machine according to my invention. The machine which includes an annular wing is flying in a horizontal straight line A—A in the direction indicated by the arrow. The thrust of the power plant is exerted along the longitudinal axis B—B of the wing, and the controls are operated in such a way as to maintain the axis B—B at a positive angle of incidence $\alpha$ (which may, for example, be between 3° and 10°) to the trajectory A—A. The power plant has sufficient thrust to cause the wing, under these conditions, to exert a lift the vertical component of which is equal to the weight of the machine (including, of course, the load) whereby the machine may fly in a level path. However it should be noted that whereas, in the construction of Fig. 1, the wing is the only lift producing part of the machine, there are many constructions (as illustrated by Figs. 2, 5, 6, 17 and 18 for instance) where the aircraft includes a fuselage or central streamlined body which, although not primarily provided to supply lift, actually does so to a far from negligible degree. Of course, in this case, in level flight conditions, the annular wing exerts a lift the vertical component of which is equal to only the difference between the weight of the machine and the lift provided by the fuselage, this difference being therefore equal to a portion of the weight of the machine amounting to most of said weight.

Preferably the power plant has sufficient thrust to enable the machine to make a vertical take-off, that is, the thrust is greater than the weight of the machine in take-off conditions.

Figure 3:
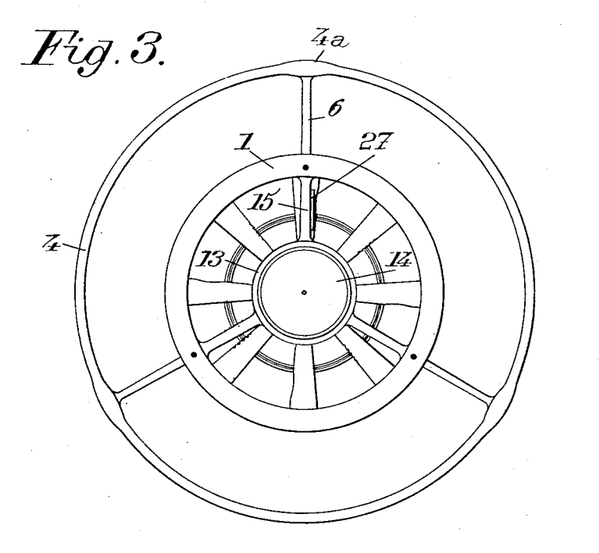

According to my invention, the aircraft has a tunnel-shaped main wing 1 having a longitudinal axis, said wing being for instance, as shown in Figs. 2 and 3, an annular wing the longitudinal axis of which is also an axis of revolution for said wing, and I house, inside the tunnel formed by the inner wall of this wing, a propelling system giving a thrust along a line which coincides substantially with said axis of revolution and the value F of which, at rest, is higher than the weight W of the flying machine when it is to take off.

It should be understood that the expression "propelling system" or "power plant" is taken here in its general meaning and that it includes all engines, or groups of engines, whatever be the type and the characteristics of said engines or groups of engines.

It should be indicated here that the choice of a tunnel-shaped supporting wing makes it possible, owing to its shell-like structure, to obtain a construction which is both light and strong whereby it is easier to obtain a structure such that the thrust F of its propelling system is higher than its total weight W.

Furthermore, an apparatus including such a tunnel-shaped wing and a propelling system surrounded at its periphery by said wing complies with the essential conditions required for high speed horizontal flying, especially at supersonic speed.

Preferably, the thrust F is higher than 1.10 W and, for instance, ranges between 1.20 W and 1.50 W.

Furthermore, it is advantageous to provide a load per unit of area of the supporting wing 1 which ranges from 75 to 200 kgs. per sq. metre, this load having preferably a value averaging 150 kgs. per sq. m. The supporting surface is, in this case, equivalent to twice the product of the mean diameter of the annular wing by its depth (i.e. the distance from the leading edge to the trailing edge thereof).

Preferably, the supporting wing 1 is made to comply with the following conditions which remain advantageous (in particular for easily exceeding transonic speeds and for a reduced specific fuel consumption).

This is true even when the wing system, instead of being of circular section, has a more or less oblong shape while remaining, of course, of the tunnel type (elliptical section, for instance).

The ratio of the outlet cross-section of the gaseous stream flowing through the passage of wing 1 to the inlet cross-section of said gaseous stream is about 1:1, either by suitable construction of the wing, or by the use of adjusting means which preferably influence the outlet section.

In this last case, advantageously, the adjustment means can be moved to such a degree that this ratio is lower than 1:1, for instance ranging from 0.6:1 to 0.9:1 when flying at cruising speed and can be opened to such a degree that said ratio reaches a value substantially higher than 1:1, for instance averaging 1.20:1 at take-off.

The aspect ratio of the wing system (ratio of diameter to depth) is lower than 1.0 and, preferably, averages 0.7.

The tunnel limited by the inner wall of wing 1 includes, near the rear, a convergent divergent portion (the throat of which is designated by reference numeral 1a) which accelerates the internal flow at high speeds and does not involve any drawback at lower speeds.

The ratio between the cross-section of throat 1a and the outlet section will be smaller as the maximum speed to be obtained increases, said ratio ranging between 0.4:1 and 0.9:1 and being for instance approximately 0.8:1.

The flying machine according to my invention further includes, rearwardly of the main wing 1, a tail unit, preferably constituted by an annular wing 4 (for instance of circular section in the example shown) further acting as a support resting on the ground for taking off and landing operations, the supporting means it carries being preferably mounted elastically.

Preferably, in order to obtain a good stability of the machine, the diameter of tail unit 4 is higher than that of the machine section of main wing 1, the ratio of these two diameters ranging advantageously from 1.20:1 to 1.75:1.

In order to equalize the pressures with which the machine bears on the ground and thus to prevent the machine when it is resting on the ground, from leaning dangerously on one side, I may provide the rear part of main wing 1, or tail unit 4 when such a tail unit exists, with supporting plates 5 which are retractable in portions 4a of said tail unit, said plates being for instance mounted pivotally so that they can extend either toward the inside or toward the outside (or possibly some toward the inside and some toward the outside) of tail unit 4.

I provide several groups of controls (steering controls, longitudinal controls, lateral controls, and so on) advantageously carried by main wing 1 and/or by tail unit 4, the controls of every group being preferably distributed symmetrically about the axis of main wing 1. These various controls will be more explicitly referred to hereinafter.

The propelling plant of the machine is housed, as above indicated, inside the tunnel formed by main wing 1.

The propelling plant may include at least one airscrew 10, the efficiency of which is increased by the fact that it works inside a fairing or tunnel where the flow of air is always subsonic.

It is possible to have this propeller driven by an electric motor fed with current from a source which may be located at the ground station (case of an observation aircraft intended merely to rise in the air above this station and which may be connected thereto by a cable).

But I may also make use of a thermal engine of the supercharged type which may be in particular, Either a piston engine, advantageously of the type in which water and methanol are injected, or A gas turbine, preferably cooled internally by means of a liquid.

It will be advantageous, in the first case, to adopt a feed pressure of at least 2.5 atmospheres and, in the second case, to make use of a compressor having a ratio of compression at least equal to 10:1.

Figure 2 shows a propeller 10 driven by a power plant of the turbine type, the turbine being shown at 11 and the compressor at 12. This system is housed in a streamlined body 13 which constitutes an extension toward the rear of the cabin 14 of the machine, said streamlined body 13 being connected through streamlined radial arms 15 with the main wing 1.

It should be noted that cooling of the turbine may advantageously be achieved as disclosed in my U.S. patent application filed on August 18, 1951, under Ser. No. 242,492, now Patent No. 2,785,613, by making use, in order to obtain circulation in the channels which constitute the cooling circuit, of the dynamic unbalance existing between the cooled liquid which arrives to the blades and the heated liquid which leaves them through a passage surrounding and protecting, from the thermal point of view, the inlet of the cold liquid.

Certain other features may be used advantageously when it is desired to obtain a machine capable of reaching high flying speeds, in particular supersonic speeds.

In this case, I preferably make use of a propelling plant including at least one turbo-propeller and at least one ram-jet engine.

Such a combination has already been suggested for airplanes having a conventional wing (flat wings); its advantages are known, being due in particular to the efficiency of the ram-jet at high speeds and to the function assumed by the turbo-propeller at lower speeds.

However, in the particular case of the present invention, that is to say in the case of a machine having a tunnel wing which surrounds the propelling plant, supplementary advantages are obtained which will be hereinafter explained.

I obtain an apparatus which adjusts itself automatically (up to a point) when flying at high speed and, in particular, at supersonic speed. This adjustment is due to the fact that, at high speeds, the adaptation of the wing is obtained automatically, that is, without requiring any mechanical adjustment modifying the wing area, because the lift coefficient is reduced when the ram-jet is heated; this heating causes a reduction of the rate of flow of the air stream passing through the tunnel space of the wing and therefore a reduction of the lift coefficient of the wing. In order to give an idea of the degree of this reduction, it may be indicated that the lift coefficient tends, at the limit, to be reduced by one-half.

On the other hand, if the casing of the ram-jet is constituted by the internal wall of the tunnel wing, a fairing (constituted by the envelope or casing of the ram-jet) is dispensed with and a gain of weight is obtained, which constitutes a second advantage inherent in the particular case where the propelling system of the ram-jet type is housed in an annular supporting wing.

It is then of interset, according to a particular feature of my invention, to make the ram-jet of dimensions such that, even at the maximum speed that is to be obtained, transformation of the supersonic external flow into subsonic internal flow (in the tunnel formed by the annular supporting wing) can take place even with a straight shock wave (which is the type of shock wave which gives rise to the maximum stagnation pressure drop).

The values of the cross-sections in the ram-jet engine, respectively at the inlet, in the combustion zone, in the throat located ahead of the outlet, and at the outlet, and the respective loads of the turbo-propeller and of the ram-jet are chosen in such a manner that supersonic flying is stable without requiring any modifications in the shape of the ram-jet casing when supersonic flying speeds are reached.

Of course, once the sections of flow above referred to have been fixed by construction, it is only possible, in order to obtain stability for various supersonic flying speeds, to act upon the respective loads of the turbo-propeller and of the ram-jet.

It is then possible, advantageously, to constitute the ram-jet portion of the propelling plant by an after-burner system provided in the rear portion of the tunnel formed by the main wing, fuel injection then taking place in a gaseous stream constituted by a mixture of pure air and of combustion gases issuing from the turbine of the turbo-propeller engine.

Distribution of the fuel can then be achieved by a distributor having rotary hollow blades driven by the internal gaseous stream, according to the features forming the subject matter of my U.S. patent application filed on August 18, 1951 under Serial No. 242,493 (now abandoned).

But I may also, instead of providing a special bladed distributor actuated by the internal gaseous stream, make use of a propelling airscrew driven by the turbo-propeller engine.

In particular, in the case (illustrated by Fig. 2) of a machine including a turbo-propeller which drives two airscrews 10 and 10a disposed in tandem-like fashion, it will be particularly advantageous to arrange said airscrews in such manner that they have hollow blades and, On the one hand, to cause the exhaust of the gases issuing from the turbine 11 to take place through orifices or slots 21 provided in the blades of the front airscrew 10, On the other hand, to achieve the injection of fuel by means of the rear airscrew 10a in which are provided, for this purpose, orifices 22 for the outflow of the fuel.

The rear airscrew 10a should then be provided with pilot igniting devices 23.

In this particular case, it will be advantageous to apply a particular feature of my invention which may be used for all after-burner systems and which consists in distributing the fuel injection orifices in such manner that the flame, when it starts, instead of corresponding to the whole section of the gaseous stream, corresponds only to a portion of said stream smaller than $9/10$ thereof and preferably averaging $5/10$. I thus increase the temperature in the combustion zone and this combustion can be achieved with a ratio of fuel to comburent which may be close to the stoichiometric ratio, whereas, when an attempt is made to cause the flame to expand, at the start, to the whole of the cross-section of the gaseous stream, combustion may be incomplete and the flame may be unstable.

For the same reason, I prefer to provide several separate injection zones.

Finally, with regard to cruising flight, it is advantageous to make use for this kind of flight, of at least two engines or groups of engines (turbo-propellers or turbo-jets, or a combination of these two types of engines) with the respective thrusts of which are different and, preferably, in a ratio to each other ranging from 5:1 to 10:1.

In this case, the characteristics of the engine (or group of engines) which has the lower power, are determined in such manner that, when it is loaded at 80% of capacity, it supplies by itself the thrust necessary for ensuring level flight at cruising speed.

Advantageously, the general cooling circuit of the propelling plant engines will be made to pass through the rotary wing elements (airscrews, fans, etc.) disposed in the fairing or tunnel formed by main wing 1, this in particular as disclosed in my U.S. patent application filed on August 18, 1951, under Serial No. 242,492, now Patent No. 2,785,613. In this case, the peripheral speed of the rotating parts which act as heat interchangers (for instance the airscrew) is substantially lower than that of the rotating parts to be cooled (blades of the turbine for instance).

As to the steering controls, they are preferably arranged in such manner that they act both on the propelling jet and on the external flow, for which purpose for instance, I provide along the trailing edge of main wing 1 a plurality of flaps 24 the control means of which are arranged in such manner that two diametrally opposed flaps are constantly nearly parallel to each other. One of the flaps then acts chiefly on the external flow (top flap of Figure 2) whereas the other acts chiefly on the internal flow (bottom flap of Figure 2).

The power thrust is adjusted chiefly by acting in the usual manner upon the degree of injection of fuel in the power plant.

However, in view of the fact that this adjustment must be very accurate and quick under certain conditions and, in particular, when landing (in order to avoid variations of thrust which would cause a sudden and violent drop to the ground), it is advantageous to provide complementary adjusting means which make it possible to achieve instantaneous variations of the thrust, such means being preferably arranged in such a manner that they act upon the gas stream flowing through the wing tunnel.

For this purpose, I may, as shown by Figure 2, provide in the wall of main wing 1 orifices 28 distributed at regular intervals, for instance in the rear part of said wing and upstream of the throat portion 1a, the opening of these orifices 28 being controlled by means of flaps 29.

When flaps 29 are opened, I deflect toward the outside a portion of the internal stream and the thrust is therefore reduced. The variations of thrust are produced instantaneously, which would not be the case if an attempt was made to perform this complementary adjustment by acting upon the degree of injection of fuel because of the inertia of the engine. By way of example, the times of response of the main adjustment device (fuel injection) and of the complementary adjustment means (orifice 28) average some seconds and some hundredths of a second respectively.

Although, in the case of Figure 2, the machine is supposed to fly horizontally (with the pilot lying down), the flaps 29 have been shown in open position, such a position corresponding as a rule to taking off and landing.

My aircraft may be provided, for taking off and landing, with means for automatically stabilizing the machine in a vertical direction, whereby the pilot is not required to give attention to this and can concentrate the whole of his attention upon the adjustments of thrust and direction which are necessary for taking off and landing.

The fuel tanks are advantageously housed in the main wing 1 and preferably symmetrically with respect to the center of gravity of the whole of the machine, according to the arrangements stated in my U.S. patent application filed August 18, 1951, under Serial No. 242,491 (now abandoned).

On the other hand, for reasons of safety which will be readily understood, supplementary special fuel tanks (and also possibly special tanks for other liquids serving to the feed of the propeller system) are provided, said special tanks being intended for landing operations in the case where the main tanks have been emptied or injured.

When the apparatus further includes means for stabilization in the vertical position as above referred to, it is of interest to provide means for automatically bringing the special tanks into operation when the stabilizing means are themselves brought into operation.

It is especially desirable to provide quick emptying means for the tanks with the exception of the special supplementary tanks, when such tanks are provided. These fuel emptying means may advantageously work by collecting air under pressure formed in the propelling plant of the machine (for instance at the output of a compressor).

From another point of view, it will be advantageous to make use of some portions of the annular wing 1 (internal or external portions) as a heat-interchanger for a cooling circuit, the region of the leading edge of said wing being particularly well adapted for this purpose.

The cabin of the machine, which is preferably coaxial with the annular wing and which is advantageously disposed ahead of said wing, may be arranged so that it can be dropped and supported by a parachute, said cabin then constituting an autonomous element.

This cabin may avantageously be reinforced and have a shell-like structure, preferably with a shape of revolution.

The seats provided in the cabin may be pivotable and have in particular an amplitude of adjustment of at least 45°, in order to enable the passengers to occupy a comfortable position both for horizontal flying and for the taking off or landing operations.

When the apparatus is to be provided with firearms, for instance guns or rockets, these arms may be mounted inside the annular wing 1 (advantageously in the leading edge thereof, in which case the different arms are preferably distributed at regular intervals at the periphery of said leading edge), or on the inside of radial arms 15 which extend between said wing 1 and the central body. In this last case, the arms are preferably located close to the central body.

Furthermore, when the firearms are located in the radial arms, they are preferably disposed at a distance from the axis of the machine such that, while converging toward the point of concentration which has been previously imposed, said arms have their axes substantially parallel to the air stream lines which circulate in their vicinity; thus, the presence of the arms will disturb the air flow to a minimum.

The apparatus may include an emergency landing device capable of being pulled out from the wing, which device may be constituted by supporting arms elastically connected to the wing or to the cabin.

The air intakes of the engines of the propelling plant may advantageously be provided at the periphery of the central body and opposite at least some of the radial arms 15 which connect said body with annular wing 1.

When the propelling plant includes fixed elements (distributors) or movable elements (airscrews, fans, etc.) essentially constituted by radial arms or radial blades, said elements being disposed in tandem-like fashion, it will be of interest to provide, for two successive elements, a different number of blades or radial arms, in order to reduce the effects of interaction.

Furthermore, it is advantageous to provide special control means for balancing possible rolling moments, which control means may be constituted for instance by spoilers 27 capable of modifying, when they occupy either of their active positions, the flow of the inner air stream on one or the other of the faces of radial arms 15 which connect the central body with the main wing. Such a unilateral modification of the flow destroys the balancing of the pressures exerted respectively on the two faces of every radial arm 15 and there is accordingly produced a compensating rolling moment if the spoiler is made to project on the suitable side.

I may also constitute the propelling plant of the machine at least partly by one or several engines or groups of engines of the jet type, that is to say including no airscrew.

Figure 4:
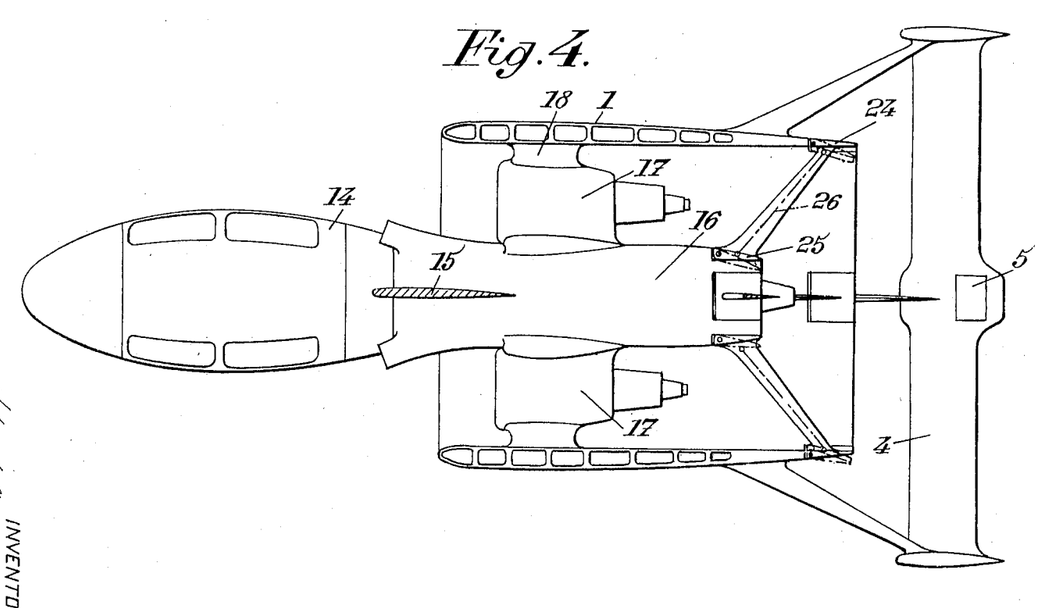
Figures 4 to 6 show, respectively in horizontal axial section, in vertical axial section and in front view, another embodiment of an aircraft according to my invention.
Figure 5:
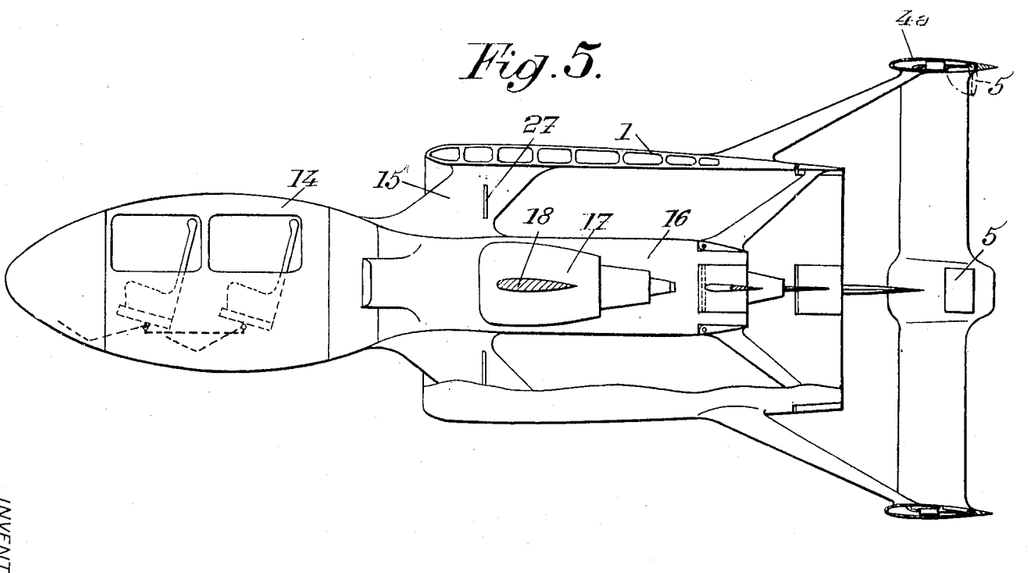
Figure 6:
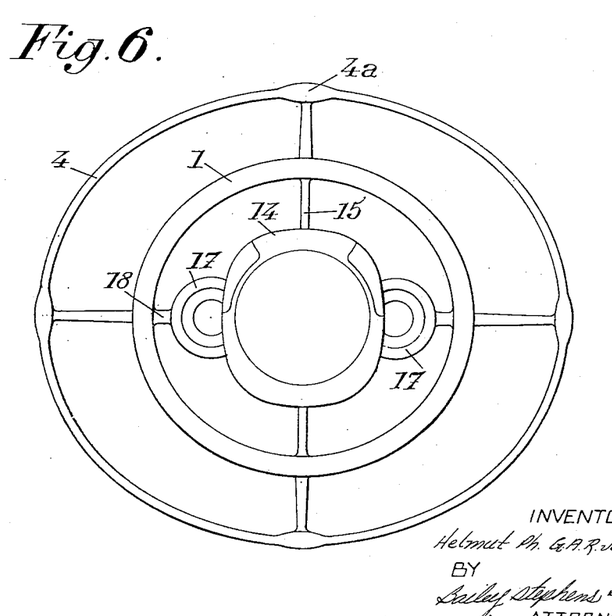

In particular, I may make use of the construction illustrated by Figs. 4 to 6 which includes, mounted side by side in an elliptic tunnel wing 1, a main turbo-jet 16 and two side turbo-jets 17 of lower power carried by a streamlined beam 18.

When the propelling plant includes at least one reaction jet (case of Fig. 4), I may provide control means 25 acting upon the direction of the jet; it is even possible, in this case, to provide both control means 24 acting upon the external and internal streams and control means 25 acting upon the direction of the jet, these two kinds of control means being then advantageously interconnected, for instance by means of links 26, in such manner that their effects are added to each other.

When the main wing 1 is oblong, for instance when it is of elliptic section as shown by Fig. 6, the ratio of the longer axis to the shorter axis of the ellipse is preferably smaller than 1.5:1 and advantageously equal to about 1.2:1.

Preferably the means for controlling supporting plates 5 are arranged in such manner that extension of said plates to the outside is achieved by the weight of the machine itself, when the machine comes into contact with the ground through the trailing edge of tail unit 4.

Figures 7, 8, 9, 10:
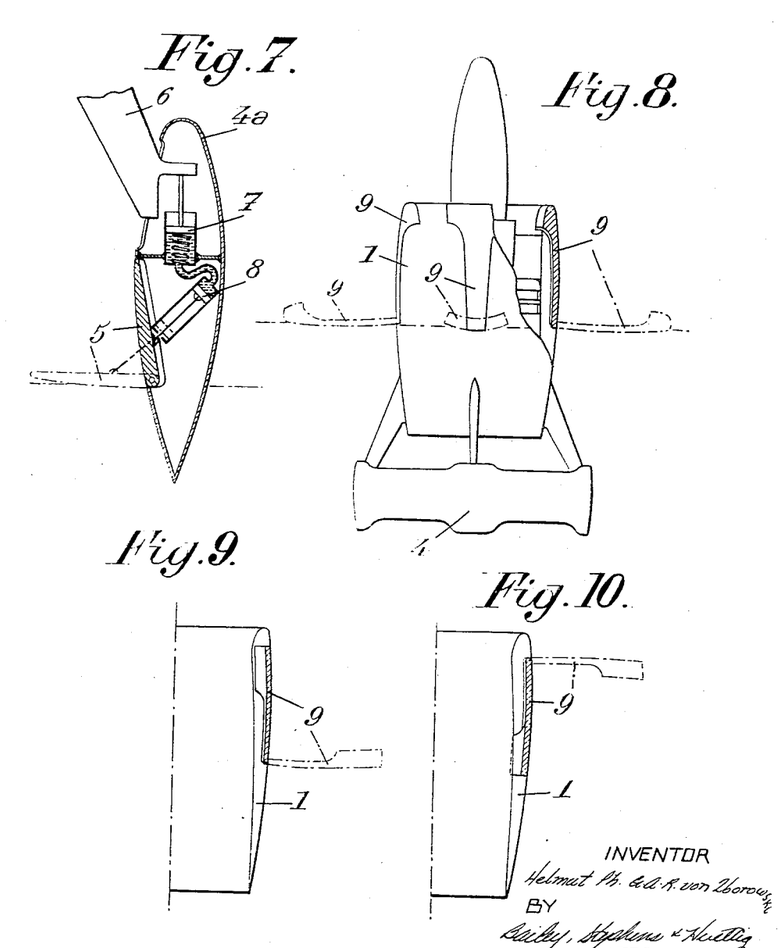
Figure 7 is a diagrammatical view showing, with parts cut away, the elements of a landing device included in said aircraft.
Figure 8 diagrammatically shows an amphibian aircraft according to my invention.
Figures 9 and 10 illustrate two modifications of retractable floats included in this amphibian aircraft.

Figure 7 shows a construction of this kind.

The supporting plates 5 are disposed in such manner that, in retracted position, they form a portion of the wall of tail unit 4, said plates being preferably carried by the reinforced portions 4a of said tail unit on which are fixed the radial arms 6 which connect tail unit 4 to main wing 1.

Supporting plates 5 are made of box-like construction, and each of these plates is controlled by a mechanical or, preferably, as shown, a hydraulic system playing the part of a shock-absorber and which essentially includes a motor piston 7 rigid with the corresponding radial arm 6 and a receiver piston 8 connected with plate 5, slots of suitable length being provided in the wall of tail unit 4 whereby the outer ends of radial arms 6 can move with respect to said tail unit 4.

I will now describe some complementary features to give the machine amphibian properties, that is to say the possibility of taking off from, and landing on, water.

These features, which are illustrated by Figs. 8 to 10, consist:

In constituting the main wing 1 and the tail unit 4 in the form of watertight hollow bodies capable of acting as floats, In determining the dimensions of said wing and said tail unit (from which depends in particular the depth of immersion), and also the weight of the machine and the relative positions of its center of gravity and of its center of buoyancy, in such manner that, when said machine is floating, its propelling system is capable of working normally and of supplying the thrust which enables it to take off, and Advantageously in providing retractable lateral stabilizers which are preferably constituted by floats 9 disposed at the periphery of the main wing 1 and arranged in such manner as to retract into said wing, either by pivoting toward the front (case of Figs. 8 and 9), or pivoting toward the rear (case of Fig. 10).

Preferably, stabilizers 9 are arranged in such manner that, in retracted position, they form a portion of the wall of main wing 1, said stabilizers being even arranged, as shown by Figure 9, to constitute, when retracted, the auxiliary front wing already referred to with reference to Figure 4.

Figure 11:
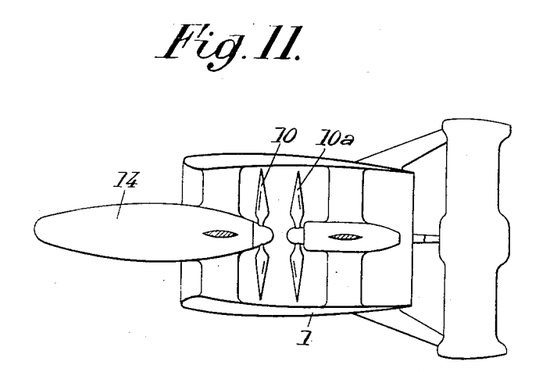
Figures 11 to 13 are three diagrammatical views showing three other embodiments of my invention.
Figure 12:
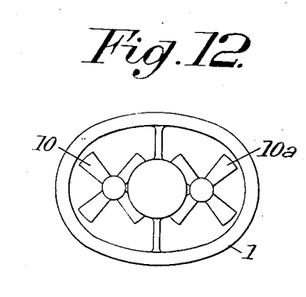

It should be noted that I might make use of two airscrews 10 and 10a driven by two independent turbo-propeller engines disposed either in tandem-like fashion as shown by Figure 11 or side by side as shown by Figure 12.

Figure 13:
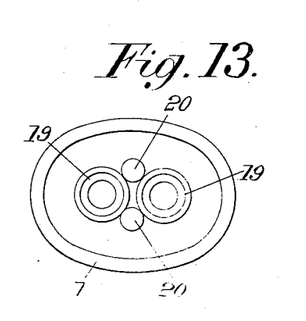
Figure 14:
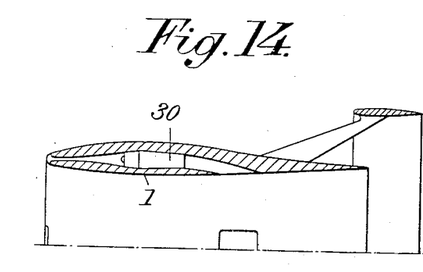
Figures 14 and 15 are respectively an axial half-section and a front half-view of an aircraft of large size made according to my invention.
Figure 15:
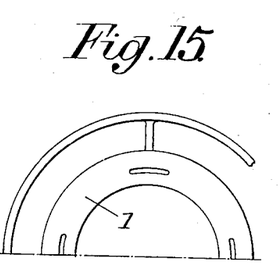

Another embodiment, illustrated by Figure 13, consists in disposing two turbo-jets 19 side by side.

Figure 16:
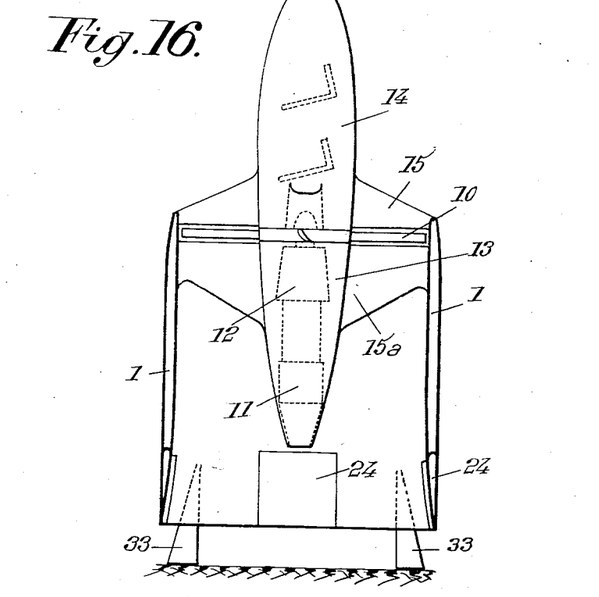
Figs. 16 and 17 are a vertical section and a plan view respectively of another aircraft made according to my invention.
Figure 17:
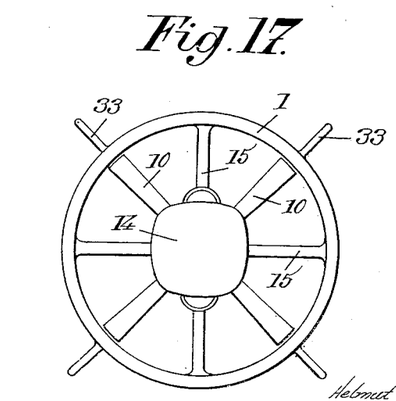

The aircraft of Figs. 16 and 17 is an army cooperation airplane designed to fly at subsonic speeds. It is propelled by a turbo-propeller (airscrew shown at 10).

The reference numbers already referred to designate in Figs. 16 and 17 the same elements as above described.

The trailing edge portion of annular wing 1 is provided with rearwardly projecting members 33 upon which the airplane is supported when it is resting on the ground. These members 33 extend outwardly so as to form radial fins.

Whatever be the type of the engines or engines or groups of engines which constitute the propelling plant of the machine, some features which should be taken into account relate to the lift (in particular when taking off), the maximum speed, and the cruising speed.

First, regarding the question of lift, the lifting force must be maximum at take-off, that is to say when the engine has its maximum weight.

I may add to the main propelling plant (engines or groups of engines) one or several auxiliary propelling devices intended to work only occasionally, in particular when taking off, such auxiliary systems being for instance constituted by one or several rockets 20 as illustrated with reference to the embodiment of Figure 13. However, when taking off exhausts the reserve of the auxiliary systems, the main propelling system must still be capable of developing a thrust sufficient to permit landing.

When the propelling system of this machine includes two engines (or groups of engines), one of the engines (or groups of engines) should be sufficient to develop the thrust necessary for landing.

While complying with this condition, the two engines (or groups of engines) will be advantageously chosen of the same power.

Of course, these features have the effect of increasing the factor of safety during take off and landing operation.

It is pointed out that flying machines made as above described are particularly well adapted to make use of nuclear energy for operating ram-jets incorporated therein, especially when the casing of the ram-jet is constituted by the inner wall of the tunnel wing.

While I have described herein some embodiments of my invention, I wish it to be understood that I do not intend to limit myself thereby, except within the scope of the claims hereto or hereinafter appended.

I claim:

1. An aircraft comprising a tunnel-shaped wing of air-foil shaped longitudinal section coaxial with the longitudinal axis of the aircraft and having longitudinally spaced leading and trailing edges, the leading edge being of rounded shape, a power plant mounted substantially coaxially of said wing to produce a thrust parallel to said axis, said wing being of such shape and dimensions as to produce at a predetermined positive angle of incidence with respect to the direction of travel of the aircraft in the air and at a speed within the power of the power plant a lift the vertical component of which is at least equal to most of the weight of the aircraft, said power plant being so housed within the space bounded by the outer wall of said wing as to provide a longitudinally extending streamlined passage of substantial cross-section through the wing, the inner wall of the wing forming the outer wall of said passage, means carried by said wing for controlling the aircraft in flight, said control means being adapted to maintain said wing at a positive angle of incidence to its trajectory, said power plant including first a jet engine having its discharge nozzle coaxial with said wing and second a ram jet engine the casing of which is constituted by the inner wall of said wing and which comprises means for supplying heat to said passage, and steering means for said aircraft including flaps distributed along the trailing edge of said wing and flaps distributed along the outlet of said nozzle, and means for interconnecting said wing flaps and said nozzle flaps respectively so that they are simultaneously rotated in the same direction.

2. An aircraft comprising a tunnel-shaped wing of airfoil shaped longitudinal section coaxial with the longitudinal axis of the aircraft and having longitudinally spaced leading and trailing edges, the leading edge being of rounded shape, a power plant mounted substantially coaxially of said wing to produce a thrust parallel to said axis, said wing being of such shape and dimensions as to produce at a predetermined positive angle of incidence with respect to the direction of travel of the aircraft in the air and at a speed within the power of the power plant a lift the vertical component of which is at least equal to most of the weight of the aircraft, said power plant being so housed within the space bounded by the outer wall of said wing as to provide a longitudinally extending streamlined passage of substantial cross-section through the wing, the inner wall of the wing forming the outer wall of said passage, means carried by said wing for controlling the aircraft in flight, said control means being adapted to maintain said wing at a positive angle of incidence to its trajectory, said power plant having a thrust at least equal to the weight of the aircraft, said power plant including means for producing a propulsive jet in said passage, and means carried by said aircraft for varying the thrust of said power plant along the longitudinal axis of the aircraft independently of the fuel feed rate to said power plant.

3. An aircraft comprising a tunnel-shaped wing of airfoil shaped longitudinal section coaxial with the longitudinal axis of the aircraft and having longitudinally spaced leading and trailing edges, the leading edge being of rounded shape, a power plant mounted substantially coaxially of said wing to produce a thrust parallel to said axis, said wing being of such shape and dimensions as to produce at a predetermined positive angle of incidence with respect to the direction of travel of the aircraft in the air and at a speed within the power of the power plant a lift the vertical component of which is at least equal to most of the weight of the aircraft, said power plant being so housed within the space bounded by the outer wall of said wing as to provide a longitudinally extending streamlined passage of substantial cross-section through the wing, the inner wall of the wing forming the outer wall of said passage, means carried by said wing for controlling the aircraft in flight, said control means being adapted to maintain said wing at a positive angle of incidence to its trajectory, said power plant having a thrust at least equal to the weight of the aircraft, said power plant including means for producing a propulsive jet in said passage, said wing being provided with holes for the outflow of a portion of the gaseous stream of said propulsive jet laterally, and inwardly movable flaps for controlling the opening and closing of said holes.

4. An aircraft comprising a tunnel-shaped wing of airfoil shaped longitudinal section coaxial with the longitudinal axis of the aircraft and having longitudinally spaced leading and trailing edges, the leading edge being of rounded shape, a power plant mounted substantially coaxially of said wing to produce a thrust parallel to said axis, said wing being of such shape and dimensions as to produce at a predetermined positive angle of incidence with respect to the direction of travel of the aircraft in the air and at a speed within the power of the power plant a lift the vertical component of which is at least equal to most of the weight of the aircraft, said power plant being so housed within the space bounded by the outer wall of said wing as to provide a longitudinally extending streamlined passage of substantial cross-section through the wing, the inner wall of the wing forming the outer wall of said passage, means carried by said wing for controlling the aircraft in flight, said control means being adapted to maintain said wing at a positive angle of incidence to its trajectory, said power plant including a ram jet engine the casing of which is constituted by the inner wall of said wing and which comprises means for supplying heat to said passage, said wing being provided with holes for the outflow of a portion of the gaseous stream of said engine laterally and flaps for controlling the opening and closing of said holes.

References Cited in the file of this patent

UNITED STATES PATENTS

| | | |
|---|---|---|
| 1,440,242 | Porter | Dec. 26, 1922 |
| 2,590,009 | Hannum | Mar. 18, 1952 |
| 2,907,536 | Von Zborowski | Oct. 6, 1959 |

FOREIGN PATENTS

| | | |
|---|---|---|
| 439,805 | Great Britain | Dec. 6, 1935 |
| 614,548 | Great Britain | Dec. 17, 1948 |
| 726,969 | Germany | Sept. 17, 1942 |
| 945,470 | France | Nov. 29, 1948 |